United States Patent [19]

Bergstrom

[11] Patent Number: 4,782,599
[45] Date of Patent: Nov. 8, 1988

[54] MEASURING LOCATION SENSOR FOR LINEAR MEASURING DEVICES

[75] Inventor: Hans R. Bergstrom, Kungsor, Sweden

[73] Assignee: Car-O-Liner Company, Wixom, Mich.

[21] Appl. No.: 69,983

[22] Filed: Jul. 6, 1987

[30] Foreign Application Priority Data

Jul. 7, 1986 [SE] Sweden ................................ 8603010

[51] Int. Cl.⁴ ............................................. G01B 5/255
[52] U.S. Cl. ........................................ 33/608; 33/288; 33/169 B
[58] Field of Search ..................... 33/158, 159, 169 B, 33/169 C, 285, 178 B, 573, 536, 520, 203.2, 600, 608, 644, 645, 638, 641, 670, 671, 676, 168 R

[56] References Cited

U.S. PATENT DOCUMENTS

| | | | |
|---|---|---|---|
| 2,178,293 | 10/1939 | Wogeck | 33/158 |
| 2,761,217 | 9/1956 | King | 33/645 X |
| 3,243,885 | 4/1966 | Johnson | 33/536 |
| 4,366,624 | 1/1983 | Bergstrom | 33/288 X |

*Primary Examiner*—Harry N. Haroian
*Attorney, Agent, or Firm*—Barnes, Kisselle, Raisch, Choaate, Whittemore & Hulbert

[57] ABSTRACT

A measuring location sensor for linear measuring devices having a probe tip of spherical configuration of a predetermined radius used for measuring the location of a hole or, in cooperation with an adaptor sleeve, a protruding element of a vehicle chassis, body or frame, irrespective of whether such hole or element is located on a horizontal surface or an inclined surface.

8 Claims, 1 Drawing Sheet

MEASURING LOCATION SENSOR FOR LINEAR MEASURING DEVICES

FIELD OF THE INVENTION

This invention relates to a measuring location sensor for use with a linear measuring device having a measuring probe capable of measuring the location of either a hole or an element projecting outwardly.

BACKGROUND OF THE INVENTION

Linear measuring devices are known which use probes having conical and graduated tips which can be raised, lowered and adjusted in orthogonal axes in relation to a selected point or location on an object. U.S. Pat. No. 4,366,624 discloses such a linear measuring device for measuring and checking a vehicle body, chassis and frame, and includes a bench with a co-acting measuring bridge.

The probes of these known linear measuring devices are unsuitable for measuring the location of either holes in a chassis or outwardly protruding objects such as the head of a screw or bolt, if they are located on a chassis surface that is inclined to the orthogonal axes. When utilizing such known probes, it is impossible to obtain a precise abutment of the probe tip with the hole or protruding object and hence an accurate measure of its location. The readings obtained on the orthogonal axes with regard to the position of the probe tip may differ, depending on where and how the tip abuts the hole or an outwardly protruding object.

SUMMARY OF THE INVENTION

A linear measuring device having a probe tip of spherical configuration of a pre-determined radius used for measuring the location of a hole or, in cooperation with an adapter sleeve, a protruding element of a vehicle chassis, body or frame irrespective of whether such hole or element is located on a horizontal surface or an inclined surface.

Objects, features and advantages of this invention are to provide a measuring device which accurately, repeatedly and readily precisely measures the location of a hole or a protruding element on inclined surfaces, can be readily adapted to prior measuring devices, and is rugged, durable, of simplified design, and economical manufacture and assembly, and has a long useful life in service.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
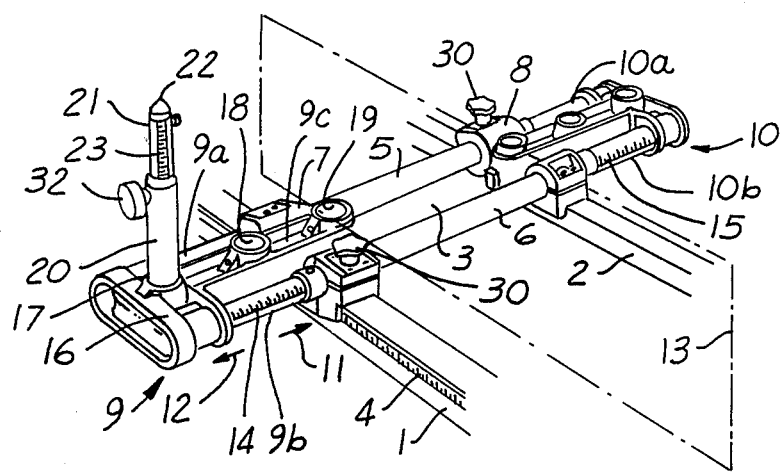
FIG. 1 is a perspective view of a prior art linear measuring device.

FIG. 1 illustrates a prior art linear measuring device having two elongated, horizontally arranged and parallel measuring beams 1 and 2, with a carriage 3 movably carried or slidably received thereon. The beams 1 and 2 are made of steel or comparable material and form part of the frame (not shown) of a measuring bridge for measuring the dimensions of a damaged vehicle chassis. The measuring bridge is placed underneath the vehicle chassis and usually rests on an alignment or straightening bench, or on some other support surface.

The carriage 3 has two parallel and spaced apart, hollow cylindrical metal tubes, 5 and 6, each extending perpendicular to the measuring beams and carried by two metallic slide shoes, 7 and 8. Each shoe, 7 and 8, is slidable along its associated beam 1 and 2. The shoes are designed to hold the cylindrical metal tubes, 5 and 6, in parallel position with respect to each other and in a position perpendicular to the beams, 1 and 2. The carriage 3 can be moved along the beams, 1 and 2, in a direction parallel to a reference plane 13. Each shoe, 7 and 8 has an adjustable means 30 for selectively locking the carriage against movement on the beams. The carriage 3 forms a holder for two U-shaped metallic measuring slides, 9 and 10, which can be displaced transversely to the direction of movement of the carriage 3. The slides, 9 and 10, are preferably constructed from hollow steel tubes or cylindrical legs, 9a, 9b and 10a, 10b respectively, and secured at one end to a carrier assembly 16. Each slide leg, 9a, 9b, 10a, 10b, is slidably received or telescoped into an associated hollow carriage tube, 5 and 6. The slides, 9 and 10, can move independently into and out of the carriage tubes, 5 and 6, as indicated by arrows 11 and 12 in FIG. 1 in a horizontal plane at right angles to the direction of movement of the carriage 3. The position of the measuring slide is related to a reference point which is a vertically elongated plane 13 extending through the bridge. The position of each slide in relation to the reference plane 13 can be measured or read off from a linear tape or scale 14 and 15 associated with each slide.

The position along the third axis, which is usually generally vertical, is measured by a probe assembly having a housing 20 which can be removably received and seated in any of three holes 17, 18 and 19 in the carrier assembly 16 of each of the slides 9 and 10. A probe 21 with a conical tip 22 is telescopically slidably received in the housing 20 and has a measuring tape or scale 23 thereon. The probe can be releasably secured by an adjustable locking means 32. Either the probe or sleeve can be rotated to bring the scale 23 to a position in which it can readily be viewed and read off.

Figure 2:
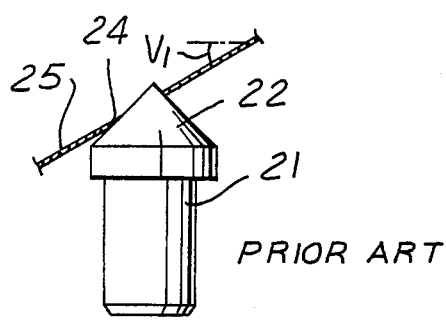
FIG. 2 is a fragmentary side view of a prior art conical probe tip of the measuring device of FIG. 1.

FIG. 2 illustrates the difficulties that arise when utilizing the measuring device with a probe having a prior art conical tip 22 to determine the location of a round hole 24 in an inclined vehicle chassis surface 25. The surface 25 is inclined to a horizontal plane at an angle $V_1$ of approximately 30° for illustrative purposes. Due to this inclination, normally the location of the center of the hole can not be accurately determined. With this arrangement, in order to obtain a correct measure of the hole location, it would be necessary to incline the probe tip 22 such that its axis forms a right angle with the inclined surface 25. This also requires consideration of complex geometry and several calculations to accurately determine the location of the hole.

Figure 3:
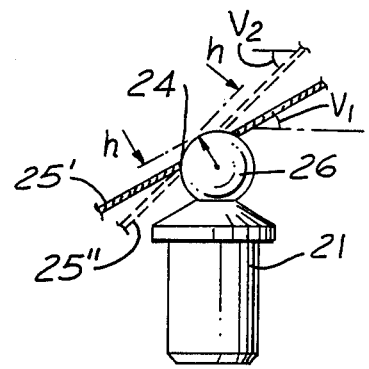
FIG. 3 is a side view of the probe of a measuring device embodying this invention and having a spherical probe tip engaging a hole of an inclined vehicle surface.

As can be easily seen from FIG. 3, the probe of this invention has a ball shaped tip 26 with a spherical configuration. The radius R of the spherical tip 26 is of a pre-determined length which is greater than the radius of the round hole 24. Thus, only part of the spherical tip 26 will penetrate into the round hole 24 to a depth h which is preferably only a few millimeters. Since this spherical tip 26 lies against a defined circular edge of the round hole 24, the probes' abutment with the hole will be precisely defined.

FIG. 3 depicts two different chassis surfaces 25' and 25" inclined at two mutually different angles $V_1$ and $V_2$, with respect to the horizontal, of 30° and 45° respectively for purposes of illustration. It will be seen that the same depth of tip penetration h is obtained in both cases. Thus, the spherical tip will provide a correct measuring result, regardless of whether the hole 24 is located on a horizontal surface or a surface inclined to the horizontal.

Figure 4:
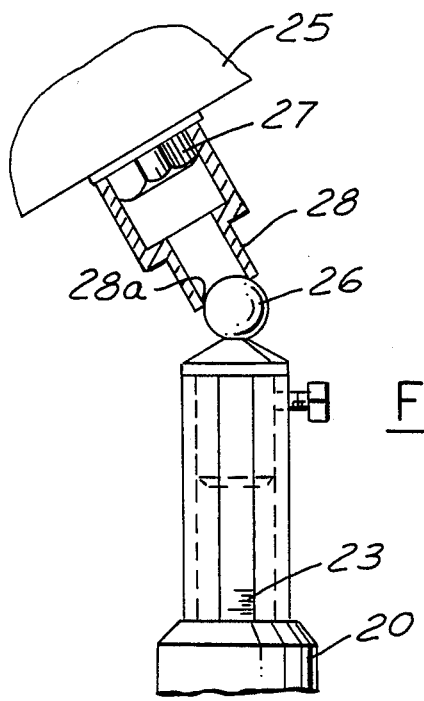
FIG. 4 is a side view of the probe of FIG. 3 in cooperation with a cylindrical adaptor sleeve engaged by the spherical probe tip and received on a screw head on an inclined vehicle surface.
Figure 5:
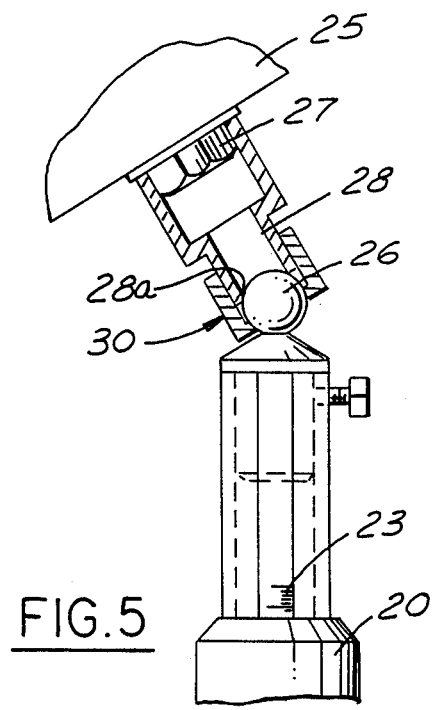
FIG. 5 is a fragmentary side view similar to FIG. 3 showing the cylindrical adapter sleeve connected to the spherical probe tip by an articulated joint.

FIG. 4 illustrates the manner in which the device with a measuring probe having a spherical tip is used to measure the location of a protrusion, such as a screw or bolt head 27, instead of a round hole. An adaptor with a cylindrical sleeve 28 is fitted over the head 27. The sleeve 28 has a circular open end 28a with an internal diameter which is less than the diameter of the ball 26 and preferably the same as the internal diameter of the round hole 24. Just as is in the case with the round hole 24, since the spherical tip 26 is bearing on the open end 28a it penetrates into this opening only a fixed distance or depth h. By knowing the length of the adaptor, the radius R of the spherical tip and this depth of penetration, it is an easy matter to calculate the measured position of the head 27.

If desired, rather than being used as a loose and separate piece, the sleeve 28 may be secured to the spherical tip 26 of the probe by means of an articulated joint 30 the construction of which will be readily apparent to a person of ordinary skill.

When using the measuring device with a spherical probe tip, it is necessary to take into account the radius R of the spherical tip, since the center of the sphere of the tip is used as a reference for the measuring scale on the probe. It is also necessary to take into account or compensate for the extent h to which the spherical tip enters into the round hole or the free end of the sleeve, and whenever the sleeve is used its length. Corrections will also be made with respect to the radius when using probe tips of different radii. Values corresponding to the radius R, penetration depth h and length of the sleeve, may be inserted into a data processor or the like so that the operator is able to measure or check the exact location of a hole or projection without having to make the necessary calculations and corrections himself. Moreover, for a probe having a spherical tip of a given radii, a given hole diameter, and a given sleeve length and diameter, the correction can be calculated and incorporated in the measuring scale of the probe so that it can be read directly by the operator without the necessity of making these calculations.

The measuring sensor embodying this invention is not restricted to use in linear measuring devices which operate only in three mutually perpendicular coordinates x-y-z, but can also be used with measuring devices which operate in polar coordinates, that is, in devices where the probe may be mounted on an arm which can be swung in horizontal and/or vertical direction.

I claim:

1. A linear measuring device for measuring the location of a round hole in a surface inclined at an acute included angle to at least one of three mutually perpendicular coordinate axes, comprising, at least one measuring beam constructed and arranged to extend longitudinally and be supported in a substantially horizontal plane, a carriage slidably mounted on said beam for movement longitudinally thereof along a first axis, a slide mounted on said carriage for movement therewith and along a second axis perpendicular to said first axis, a probe assembly removably carried by said slide for movement therewith and having a probe which can be extended and retracted relative to said slide along a third axis pependicular to both said first axis and said second axis, a spherical tip received on said probe for movement therewith and having an outside diameter greater than the inside diameter of the round hole in the inclined surface, a measuring scale carried by said probe assembly and calibrated as a function of the outside diameter of the spherical tip and a given inside diameter for a round hole, and a housing removably received and seated in said slide for movement therewith, said probe being telescopically slidably received in said housing, said spherical tip being removably received and seated on said probe, and said scale being caried by said probe for movement therewith relative to said housing.

2. The measuring device of claim 1 wherein said scale is calibrated such that if the hole on which the probe bears has an actual diameter equal to such given inside diameter then the scale can be read directly in conventional units of linear measurement.

3. The measuring device of claim 1 in which said spherical tip is removably received on said probe.

4. A linear measuring device for measuring the location on a surface inclined at an acute included angle to at least one of three mutually perpendicular coordinate axes of an element projecting from the inclined surface, comprising: at least one measuring beam constructed, arranged and extending longitudinally to be supported in a substantially horizontal plane, a carriage slidably mounted on said beam for movement longitudinally thereof along a first axis, a slide carried by said carriage for movement therewith and along a second axis perpendicular to said first axis, a probe assembly removably carried by said slide for movement therewith and having a probe which can be extended and retracted relative to said slide along a third axis perpendicular to both said first axis and said second axis, a spherical tip received on said probe for movement therewith along said third axis, an adapter having a sleeve slidably fitted over the projecting element on the inclined surface and an open end with a round hole having an inside diameter which is less than the outside diameter of the spherical tip, and a measuring scale carried by said probe assembly and calibrated as a function of such outside diameter of said spherical tip, such inside diameter of the round hold of said adapter and the length of said adapter.

5. The device of claim 4 which also comprises, an articulated joint connecting said adapter to said spherical tip.

6. The measuring device of claim 4 wherein said scale is calibrated such that when said adapter is received on the projecting element and said spherical tip projects into the hole and bears on the end of said adapter, the location of the projecting element on the inclined surface relative to the coordinate axes of the measuring device can be read directly in conventional units of linear measurement.

7. The measuring device of claim 4 in which said spherical tip is removably received on said probe.

8. The measuring device of claim 4 wherein said probe assembly has a housing removably received and seated in said slide for movement therewith, said probe is telescopically slidably received in said housing, said spherical tip is removably received and seated on said probe, and said scale is carried by said probe for movement therewith relative to said housing.

* * * * *